United States Patent
Ura et al.

[11] Patent Number: 5,856,802
[45] Date of Patent: Jan. 5, 1999

[54] VEHICLE NAVIGATOR

[75] Inventors: Taro Ura, Kasuga; Kenichi Nakano, Fukuoka; Keiichi Zenmyo, Fukuoka-ken; Kazuhiko Ikeda, Dazaifu, all of Japan

[73] Assignee: Matsushita Electric Industrial Co., Ltd., Osaka, Japan

[21] Appl. No.: 871,902

[22] Filed: Jun. 12, 1997

[30] Foreign Application Priority Data

Jun. 14, 1996 [JP] Japan ................................. 8-153943

[51] Int. Cl.[6] .............................. H04B 7/185; G01S 5/02
[52] U.S. Cl. ......................................... 342/357; 701/214
[58] Field of Search ............................. 342/357; 701/213, 701/214

[56] References Cited

U.S. PATENT DOCUMENTS 5,416,712  5/1995  Geier et al. ............................. 342/357

Primary Examiner—Theodore M. Blum
Attorney, Agent, or Firm—Venable; Robert J. Frank

[57] ABSTRACT

A vehicle navigator for calculating a running distance of a vehicle from output data of an acceleration sensor, an increase of accumulated errors during the calculation of the vehicle running distance being suppressed. The vehicle navigator has an acceleration sensor for detecting an acceleration of the vehicle; a velocity calculator for calculating a first velocity of the vehicle on the basis of an acceleration detected by the acceleration sensor; a GPS receiver for receiving radio waves from artificial satellites and obtaining a second velocity; a velocity correcting unit for correcting the first velocity by using the second velocity; a running distance calculator for calculating the running distance of the vehicle from the velocity corrected by the velocity correcting unit; and a velocity limiter for setting a velocity limit value range relative to the first velocity if the second velocity cannot be obtained from the GPS receiver, in order to control the first velocity so that it does not exceed the velocity limit value range.

10 Claims, 3 Drawing Sheets

VEHICLE NAVIGATOR

BACKGROUND OF THE INVENTION

1. Field of the Invention

The present invention relates to a vehicle navigator capable of detecting the position of a vehicle.

2. Description of the Related Art

A conventional vehicle navigator will be described.

FIG. 2 is a functional block diagram of a conventional vehicle navigator. In FIG. 2, reference numeral 1 represents an acceleration sensor for detecting an acceleration of a vehicle along its running direction to calculate the running distance of the vehicle. Reference numeral 2 represents a gyro sensor for detecting an angular velocity of the vehicle along its yawing direction to calculate the running azimuth of the vehicle. Reference numeral 3 represents a global positioning system (GPS) receiver for receiving radio waves from a plurality of GPS satellites to obtain positioning data of the vehicle. Reference numeral 4 represents a running distance calculator for calculating the running distance of the vehicle in accordance with output data of the acceleration sensor 1. Reference numeral 5 represents a running azimuth calculator for calculating the running azimuth of the vehicle in accordance with output data of the gyro sensor 2. Reference numeral 6 represents a relative position calculator for calculating the present position of the vehicle by adding the vehicle running distance and the vehicle running azimuth output from the running distance calculator 4 and the running azimuth calculator 5, to the previous vehicle position. Reference numeral 7 represents a reliability judging unit for judging the reliability of positioning data output from the GPS receiver 3. Reference numeral 8 represents a velocity correcting unit for correcting a velocity of the vehicle calculated from data output from the acceleration sensor 1. Reference numeral 9 represents a position determining unit for determining the position of the vehicle on the basis of the position of the vehicle output from the GPS receiver 3 and the relative position calculator 6. Reference numeral 10 represents a map storage for storing map data. Reference numeral 11 represents a display unit for displaying image data such as the position of the vehicle or map data. Reference numeral 12 represents a controller for fetching from the map storage 10 map data of a predetermined area corresponding to the position of the vehicle on the basis of the data output from the position determining unit 9, and outputting the vehicle position and map data to the display unit 11.

FIG. 3 is a conceptual diagram showing a conventional vehicle navigator. As shown in FIG. 3, the acceleration sensor 1 and the gyro sensor 2 are mounted on a vehicle 13 so that they can detect an acceleration of the vehicle along its running direction and an angular velocity of the vehicle along its yawing direction, respectively. The GPS receiver 3 is also mounted on the vehicle. An antenna (not shown) of the GPS receiver for receiving radio waves from GPS satellites is preferably mounted on the roof of the vehicle. Reference numeral 14 represents the main body of the vehicle navigator.

Referring to FIG. 2, if the GPS receiver 3 can capture at least a predetermined number of GPS satellites necessary for calculating the vehicle position, the position determining unit 9 adopts the vehicle position sent from the GPS receiver 3 and outputs it to the controller 12. Conversely, if the GPS receiver 3 cannot capture a predetermined number of GPS satellites necessary for calculating the vehicle position, the relative position calculator 6 calculates the vehicle position on the basis of data output from the acceleration sensor 1 and the gyro sensor 2. The calculation of the vehicle position by the relative position calculator 6 will now be described.

First, the running distance calculator 4 double integrates in the time domain the data output from the acceleration sensor 1 at a predetermined time interval $\Delta t$. Namely, the following two equations (1) and (2) are used to calculate a vehicle velocity $V_n$ and a running distance $\Delta D_n$:

$$V_n = V_0 + \sum_{i=1}^{n} a_i \cdot \Delta t \tag{1}$$

$$\Delta D_n = V_{n-1} \cdot \Delta t + 0.5 \cdot a_n \cdot \Delta t^2 \tag{2}$$

where $\Delta t$ is a time interval during which output data is obtained from the acceleration sensor 1, $a_i$ is the acceleration of the vehicle at time i, $V_n$ is the velocity of the vehicle at time n, $\Delta D_n$ is a running distance of the vehicle during the time interval $\Delta t$, and $V_0$ is the initial velocity of the vehicle.

The running azimuth calculator 5 integrates in the time domain the data output from the gyro sensor 2 at the predetermined time interval $\Delta t$. Namely, the following equation (3) is used to calculate a running azimuth $\theta_n$ of the vehicle:

$$\theta_n = \theta_0 + \sum_{i=1}^{n} \omega_i \cdot \Delta t \tag{3}$$

where $\Delta t$ is an interval during which output data is obtained from the gyro sensor 2, $\omega_i$ is the angular velocity at the time i, $\theta_n$ is the running azimuth of the vehicle at the time n, and $\theta_0$ is the initial azimuth.

FIG. 4 is a conceptual diagram illustrating the position calculation by the relative position calculator 6 of the conventional vehicle navigator. Receiving the vehicle running distance $\Delta D_n$ and the vehicle running azimuth $\theta_n$, the relative position calculator 6 performs a cumulative calculation starting from the vehicle initial position by using the following equations (4) and (5) to obtain the vehicle position:

$$x_n = x_0 + \sum_{i=1}^{n} \Delta D_i \cdot \sin\theta_i \tag{4}$$

$$y_n = y_0 + \sum_{i=1}^{n} \Delta D_i \cdot \cos\theta_i \tag{5}$$

where $(X_n, Y_n)$ are the coordinate values of the vehicle position at time n and $(X_0, Y_0)$ are the coordinate values of the vehicle at the initial position.

Vehicle position information output from the relative position calculator 6 is supplied to the position determining unit 9. The vehicle position information determined by the position determining unit 9 on the basis of the vehicle positions output from the relative position calculator 6 or the GPS receiver 3 is output to the controller 12. Upon reception of the vehicle position information, the controller 12 reads map data of a predetermined area from the map storage 10 and outputs it to the display unit 11.

In this vehicle navigator for calculating the running distance of the vehicle on the basis of the data output from the acceleration sensor 1, the running distance is calculated by double integrating the data detected at the predetermined time interval and output from the acceleration sensor 1 and by performing the cumulative calculation starting from the initial position. In this calculation, the initial conditions of the vehicle, i.e., initial position and initial velocity are required. A vehicle stop state or the like has been used as such initial conditions. However, cumulative calculation starting from the initial position also accumulates errors contained in the data output from the acceleration sensor 1. Therefore, as the running time increases, the errors increase so that the vehicle position displayed on map data differs greatly from the real vehicle position. A method of preventing an increase of errors by using GPS positioning data will now be described.

As data detected with the acceleration sensor 1 at the predetermined time interval Δt is output, the running distance calculator 4 uses the equations (1) and (2) and the data output from the acceleration sensor 1 to calculate a vehicle velocity (hereinafter called a "first velocity") and a running distance. The GPS receiver 3 outputs a vehicle velocity (hereinafter called a "second velocity") which is calculated by using the Doppler frequency shift of a signal transmitted from each GPS satellite. The velocity correcting unit 8 replaces the first velocity calculated by the running distance calculator 4 by the second velocity supplied from the GPS receiver 3.

If the precision of the second velocity output from the GPS receiver 3 is poor, the correction effects by the velocity correcting unit 8 are degraded. Therefore, the velocity correcting unit 8 corrects the velocity only when precision information output from the GPS receiver indicates that the precision is high.

The precision of the second velocity output from the GPS receiver 3 is judged by the reliability judging unit 7. The reliability judging unit 7 judges the reliability of the second velocity by using: information called a user equivalent error (UERE) representative of positioning system errors (such as the stability of a timer installed in a GPS satellite, delay in the transmission of a signal from the GPS, satellite orbit preheat, and the like) received by the GPS receiver 3; information called a DOP which is a geometrical deterioration coefficient related to the positional relationship between the GPS receiver 3 and GPS satellites; information related to the intensity of the radio wave transmitted from each GPS satellite, and other pieces of information. The reliability judging unit 7 stores therein preset threshold values of UERE, DOP, radio wave intensity, and other information and compares the signal output from the GPS receiver 3 with predetermined threshold values to thereby judge the reliability of the second velocity from the GPS receiver.

If the reliability judging unit 7 judges that the second velocity of the vehicle output from the GPS receiver 3 is highly reliable, the velocity correcting unit 8 replaces the first velocity supplied from the running distance calculator 4 with the second velocity, and the running distance calculator 4 calculates the vehicle running distance from the second velocity. In the above manner, accumulation of errors contained in the output data of the acceleration sensor 1 has been reduced conventionally.

As mentioned above, in the vehicle navigator for calculating the running distance of the vehicle on the basis of the data output from the acceleration sensor at the predetermined time interval and performing cumulative calculation starting from the initial position, as the running distance from the initial position becomes long, errors are accumulated so that the precision of the calculated running distance becomes low. In order to avoid the accumulation of errors, a method has been proposed in which output data of the acceleration sensor is corrected by GPS positioning data. However, if the radio waves from GPS satellites are blocked for a long time, such as while a vehicle is running in a long tunnel, the output data of the acceleration sensor cannot be corrected, errors are accumulated, and the precision of the calculated running distance becomes very poor.

SUMMARY OF THE INVENTION

It is an object of the present invention to provide a vehicle navigator for calculating the running distance of a vehicle on the basis of data output from an acceleration sensor, capable of preventing an increase of accumulated errors during calculation of a vehicle running distance even if radio waves from GPS satellites are intercepted so that they do not reach the GPS receiver.

According to one aspect of the present invention, a vehicle navigator is provided which comprises: acceleration detecting means for detecting an acceleration of a vehicle; velocity calculating means for calculating a first velocity of the vehicle on the basis of an acceleration detected by said acceleration detecting means; receiving means for receiving radio waves from artificial satellites and obtaining a second velocity; velocity correcting means for correcting the first velocity by using the second velocity; running distance calculating means for calculating a running distance of the vehicle from the velocity corrected by said velocity correcting means; and velocity limiting means for setting a velocity limit value range relative to the first velocity if the second velocity cannot be obtained from said receiving means, in order to control the first velocity not to exceed the velocity limit value range.

Even if correction by positioning data from GPS satellites is impossible, an increase of accumulated errors during calculation of a vehicle running distance can be prevented so that a vehicle navigator having a high precision of position detection can be provided.

DETAILED DESCRIPTION OF THE PREFERRED EMBODIMENTS

An embodiment of the invention will be described with reference to the accompanying drawings.

Figure 1:
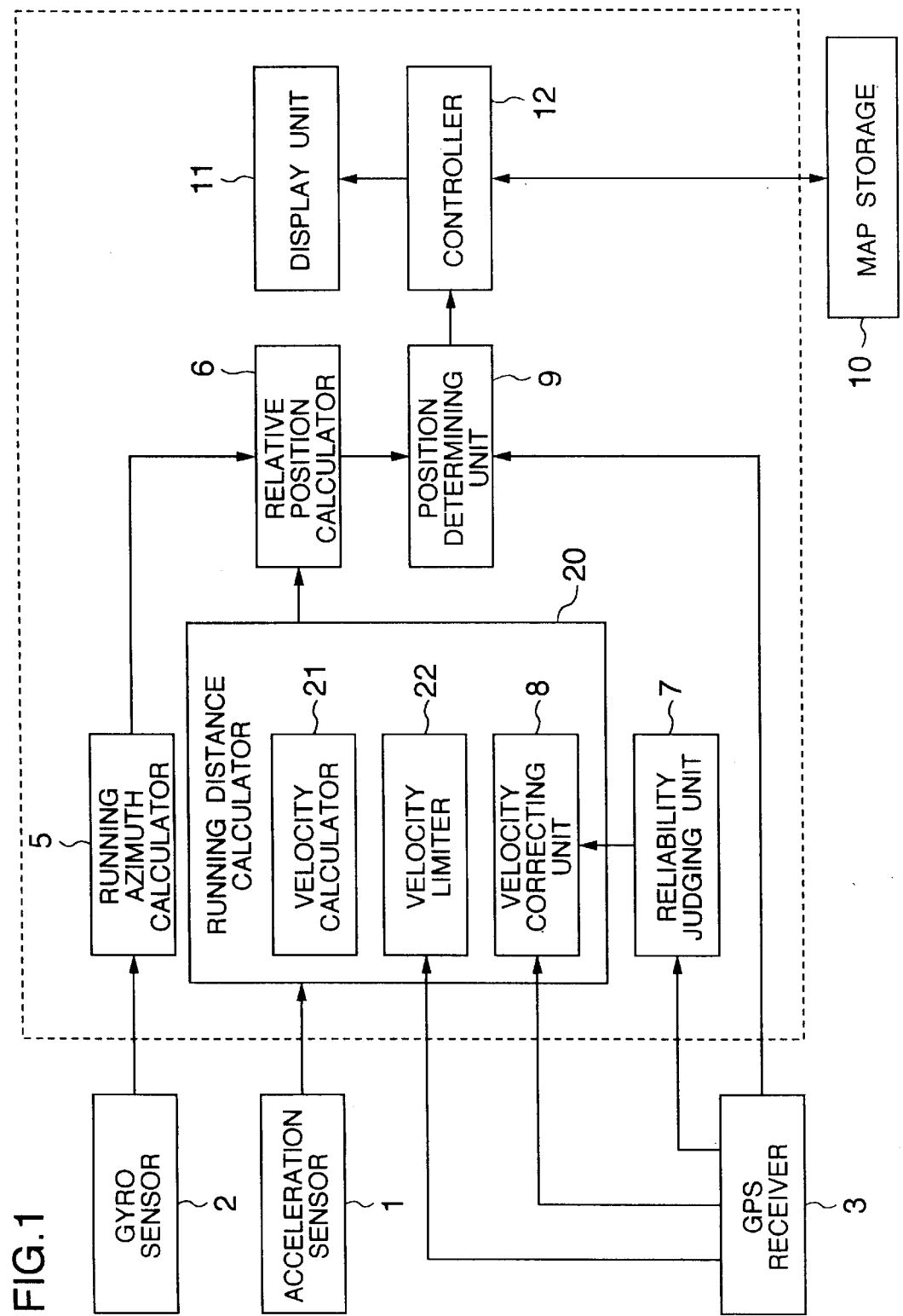
FIG. 1 is a functional block diagram of a vehicle navigator according to an embodiment of the invention.

FIG. 1 is a functional block diagram showing a vehicle navigator according to the embodiment of the invention. The vehicle navigator is mounted on a vehicle.

Referring to FIG. 1, reference numeral 1 represents an acceleration sensor for detecting an acceleration of a vehicle along its running direction to obtain a running distance of the vehicle. Reference numeral 2 represents a gyro sensor for detecting an angular velocity of the vehicle along its yaw direction to obtain a running azimuth of the vehicle. Reference numeral 3 represents a GPS receiver for receiving radio waves from a plurality of GPS satellites to obtain positioning data of the vehicle.

Reference numeral 21 represents a velocity calculator for calculating the velocity of the vehicle (hereinafter called a "first velocity") by integrating data output from the acceleration sensor 1. Reference numeral 20 represents a running distance calculator for calculating the running distance of the vehicle by integrating the first velocity. Reference numeral 5 represents a running azimuth calculator for calculating the azimuth of the vehicle on the basis of the data output from the gyro sensor 2. Reference numeral 6 represents a relative position calculator for calculating the present position of the vehicle by adding the vehicle running distance and the vehicle running azimuth output from the running distance calculator 20 and the running azimuth calculator 5, to the previous vehicle position.

Reference numeral 7 represents a reliability judging unit for judging the reliability of positioning data of the vehicle on the basis of precision information output from the GPS receiver 3. Reference numeral 8 represents a velocity correcting unit for correcting the first velocity of the vehicle calculated from data output from the acceleration sensor 1, by using a vehicle velocity (hereinafter called a "second velocity") represented by positioning data of the GPS receiver 3.

Reference numeral 9 represents a position determining unit for determining the position of the vehicle on the basis of the data output from the GPS receiver 3 and the relative position calculator 6. Reference numeral 10 represents a map storage such as a CD-ROM for storing digital map data. Reference numeral 11 represents a display unit for displaying the position of the vehicle and map data on the screen of, for example, an LCD. Reference numeral 12 represents a controller for fetching map data of a predetermined area corresponding to the position of the vehicle output from the position determining unit 12, and outputting the vehicle position and map data to the display unit 11.

Reference numeral 22 represents a velocity limiter for setting a velocity limit value relative to the first velocity calculated by the velocity calculator 21.

The operation of the vehicle navigator constructed as above will now be described.

Figure 2:
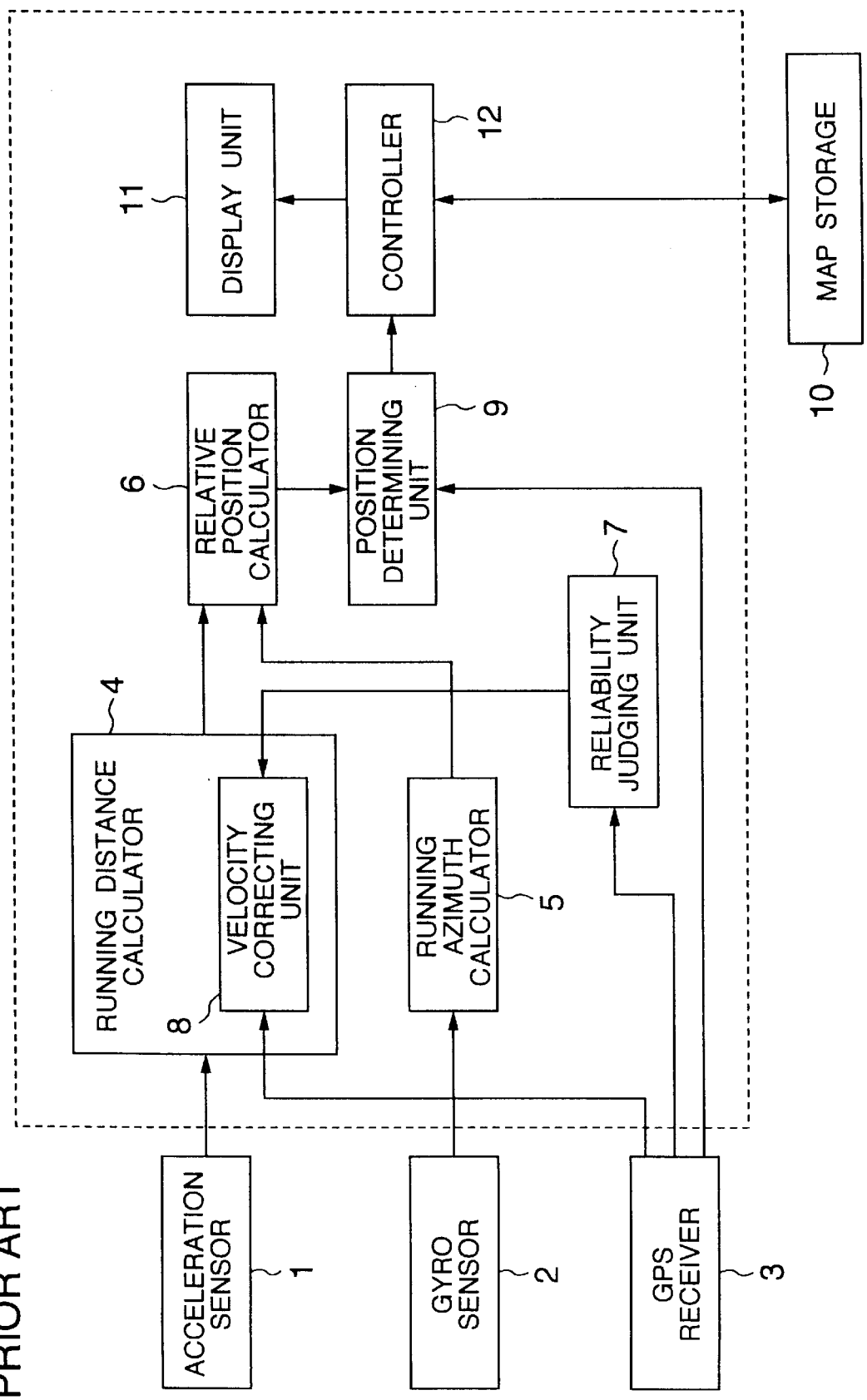
FIG. 2 is a functional block diagram of a conventional vehicle navigator.
Figure 3:
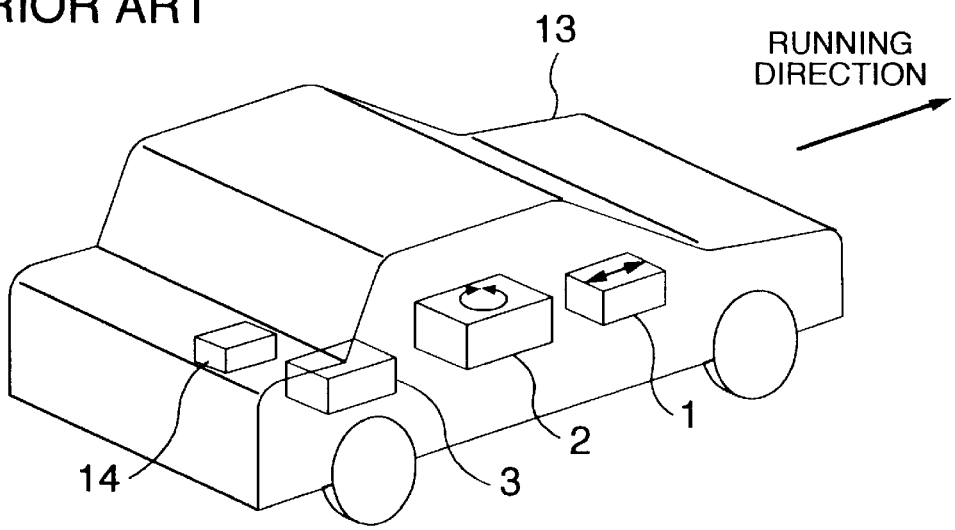
FIG. 3 is a conceptual diagram illustrating a conventional vehicle navigator.
Figure 4:
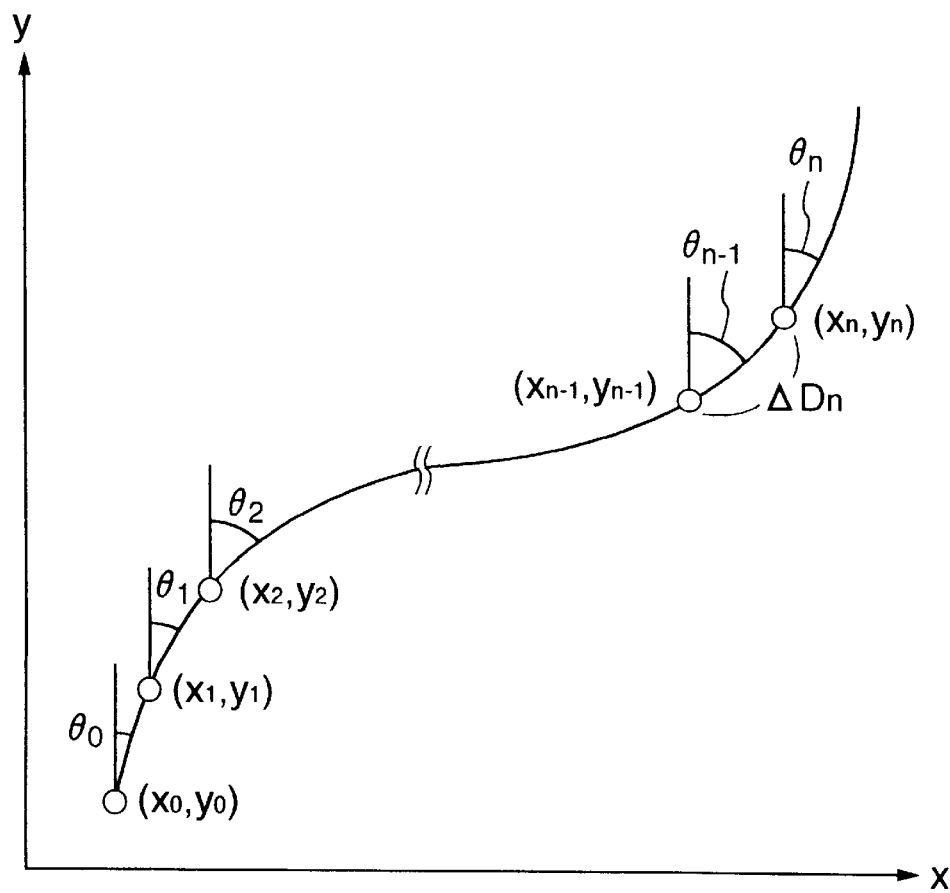
FIG. 4 is a conceptual diagram illustrating the calculation of vehicle position by a relative position calculator of the conventional vehicle navigator.

As shown in FIGS. 1 and 2, similar to a conventional vehicle navigator, if the GPS receiver 3 can capture at least the predetermined number of GPS satellites necessary for calculating the vehicle position, the position determining unit 9 adopts the vehicle position sent from the GPS receiver 3 and outputs it to the controller 12. Conversely, if the vehicle position cannot be obtained from the GPS receiver 3, the position determining unit 9 sends the vehicle position supplied from the relative position calculator 6 to the controller 12, this vehicle position being calculated by the relative position calculator 6 through cumulative calculation of a running distance and a running azimuth supplied from the running distance calculator 20 and the running azimuth calculator 5.

In this embodiment, the velocity limiter 22 compares the radio wave reception state of GPS satellites with a signal received by the GPS receiver 3 representative of an electric field intensity and the like.

If radio waves from GPS satellites are intercepted, for example, as in the case where the vehicle runs in a tunnel, the running distance calculated by the running distance calculator 20 from the output data of the acceleration sensor 1 cannot be corrected by the velocity correcting unit 8 as in a conventional example. Therefore, if radio waves from GPS satellites are intercepted for a long time, errors are accumulated as described previously, and the calculated vehicle position differs greatly from the real vehicle position. In this embodiment, therefore, in accordance with the reception state of radio waves from GPS satellites, the first velocity of the vehicle calculated by the running distance calculator 20 from the output data of the acceleration sensor 1 is set with a velocity limit value to thereby reduce accumulated errors. This operation will now be described.

The velocity limiter 22 compares each value representative of the GPS reception state of satellite signals received by the GPS receiver 3 such as electric field intensity, with each corresponding preset threshold value. If the value representative of the GPS reception state becomes lower than the threshold value, the velocity limiter 22 judges that radio waves from the GPS satellites are being intercepted. In this case, a velocity limit value is set relative to the first velocity of the vehicle calculated by the velocity calculator 21 from the output data of the acceleration sensor 1 in order to control the first velocity not to exceed the velocity limit value (e.g., if the first velocity exceeds the velocity limit value, the first velocity is replaced by the velocity limit value). If the reception state of radio waves from GPS satellites is recovered, the velocity limit value is released and the velocity correcting unit 8 corrects the first velocity by using the second velocity.

The method of setting the velocity limit value by the velocity limiter 22 will be described in more detail. If the velocity limiter 22 judges that the GPS reception state has become worse than a threshold value, the velocity limiter 22 sets an upper limit velocity obtained by adding a predetermined value to a reference velocity which is in this case the first velocity calculated by the velocity calculator 21, and a lower limit velocity obtained by subtracting the predetermined value from the reference velocity, and adopts at least one of the upper and lower limit values as the velocity limit value. The predetermined value added to or subtracted from the reference value is determined in accordance with a general running state in a tunnel, a general running state under the environment that radio waves from GPS satellites are perfectly intercepted or blocked, and other running states. This value is generally and preferably set in the range from 0 km/h to 50 km/h. By setting the velocity limit value in the above manner, the calculated first velocity can be prevented from being made considerably different from the real vehicle velocity under the environment of perfect interception or blocking of radio waves. Therefore, the precision of vehicle velocity and hence running distance can be prevented from being decreased.

Another method of setting the velocity limit value by the velocity limiter 11 will be described. Used as the reference velocity is a mean velocity of vehicle velocities during a predetermined past time (or within a predetermined past running distance) before the velocity limiter 22 judges that the GPS reception state becomes worse than a threshold value. The velocity limiter 22 sets an upper limit velocity obtained by adding a predetermined value to this reference velocity and a lower limit velocity obtained by subtracting the predetermined value from the reference velocity, and adopts at least one of the upper and lower limit values as the velocity limit value. In this case, it is necessary to provide a velocity history storage (not shown) for storing vehicle velocities during the predetermined past time. With this method, the reference velocity can be set by taking into consideration a velocity history of each vehicle, i.e., a running pattern of each vehicle so that the finer control of a vehicle velocity can be realized.

A still further method of setting the velocity limit value by the velocity limiter 11 will be described. Used as the reference velocity is a legal limit velocity of the present road which is read, when the velocity limiter 22 judges that the GPS reception state becomes worse than a threshold value, from a legal limit velocity storage (not shown) for storing legal limit velocities of roads. The velocity limiter 22 sets an upper limit velocity obtained by adding a predetermined value to this reference velocity and a lower limit velocity obtained by subtracting the predetermined value from the reference velocity, and adopts at least one of the upper and lower limit values as the velocity limit value. Legal limit velocities may be stored in the map storage 10 in correspondence with the map data.

Still another method of setting the velocity limit value by the velocity limiter 11 will be described. If the velocity limiter 22 judges that the GPS reception state becomes worse than a threshold value and the first velocity calculated by the velocity calculator 21 takes a zero value or a minus value under the condition that the vehicle is not in a stop state, then the first velocity is replaced by the legal limit velocity.

What is claimed is:

1. A vehicle navigator for receiving radio waves from artificial satellites and outputting present position information, said vehicle navigator comprising:

acceleration detecting means for detecting an acceleration of a vehicle;

velocity calculating means for calculating a first velocity of the vehicle on the basis of an acceleration detected by said acceleration detecting means;

receiving means for receiving radio waves from artificial satellites and obtaining a second velocity;

velocity correcting means for correcting the first velocity by using the second velocity;

running distance calculating means for calculating a running distance of the vehicle from the velocity corrected by said velocity correcting means; and velocity limiting means for setting a velocity limit value range relative to the first velocity if the second velocity is judged to be unobtainable from said receiving means, in order to control the first velocity not to exceed the velocity limit value range, said velocity limiting means using as a reference velocity the first velocity calculated by said velocity calculating means if the second velocity is judged to be unobtainable from said receiving means, obtaining upper and lower velocity limit values through addition and subtraction of a predetermined value to and from the reference velocity, and adopting one of the upper and lower velocity limit values as the velocity limit value.

2. A vehicle navigator for receiving radio waves from artificial satellites and outputting present position information, said vehicle navigator comprising:

velocity detecting means for detecting a first velocity of a vehicle;

receiving means for receiving radio waves from artificial satellites and obtaining a second velocity;

velocity correcting means for correcting the first velocity by using the second velocity;

running distance calculating means for calculating a running distance of the vehicle from the velocity corrected by said velocity correcting means; and velocity limiting means for setting a velocity limit value range relative to the first velocity if the second velocity is judged to be unobtainable from said receiving means, in order to control the first velocity not to exceed the velocity limit value range, said velocity limiting means using as a reference velocity the first velocity calculated by said velocity calculating means if the second velocity is judged to be unobtainable from said receiving means, obtaining upper and lower velocity limit values through addition and subtraction of a predetermined value to and from the reference velocity, and adopting one of the upper and lower velocity limit values as the velocity limit value.

3. A vehicle navigator for receiving radio waves from artificial satellites and outputting present position information, said vehicle navigator comprising:

acceleration detecting means for detecting an acceleration of a vehicle;

velocity calculating means for calculating a first velocity of the vehicle on the basis of an acceleration detected by said acceleration detecting means;

receiving means for receiving radio waves from artificial satellites and obtaining a second velocity;

velocity correcting means for correcting the first velocity by using the second velocity;

running distance calculating means for calculating a running distance of the vehicle from the velocity corrected by said velocity correcting means;

velocity limiting means for setting a velocity limit value range relative to the first velocity if the second velocity is judged to be unobtainable from said receiving means, in order to control the first velocity not to exceed the velocity limit value range; and velocity history storage means for storing velocities in the past, said velocity limiting means using as a reference velocity a mean velocity of velocities during a predetermined past time calculated from information stored in said velocity history storage means if the second velocity is judged to be unobtainable from said receiving means; obtaining upper and lower velocity limit values through addition and subtraction of a predetermined value to and from the reference velocity, and adopting one of the upper and lower velocity limit values as the velocity limit value.

4. A vehicle navigator for receiving radio waves from artificial satellites and outputting present position information, said vehicle navigator comprising:

velocity detecting means for detecting a first velocity of a vehicle;

receiving means for receiving radio waves from artificial satellites and obtaining a second velocity;

velocity correcting means for correcting the first velocity by using the second velocity;

running distance calculating means for calculating a running distance of the vehicle from the velocity corrected by said velocity correcting means;

velocity limiting means for setting a velocity limit value range relative to the first velocity if the second velocity is judged to be unobtainable from said receiving means, in order to control the first velocity not to exceed the velocity limit value range; and velocity history storage means for storing velocities in the past, said velocity limiting means using as a reference velocity a mean velocity of velocities during a predetermined past time calculated from information stored in said velocity history storage means if the second velocity is judged to be unobtainable from said receiving means; obtaining upper and lower velocity limit values through addition and subtraction of a predetermined value to and from the reference velocity, and adopting one of the upper and lower velocity limit values as the velocity limit value.

5. A vehicle navigator for receiving radio waves from artificial satellites and outputting present position information, said vehicle navigator comprising:

acceleration detecting means for detecting an acceleration of a vehicle;

velocity calculating means for calculating a first velocity of the vehicle on the basis of an acceleration detected by said acceleration detecting means;

receiving means for receiving radio waves from artificial satellites and obtaining a second velocity;

velocity correcting means for correcting the first velocity by using the second velocity;

running distance calculating means for calculating a running distance of the vehicle from the velocity corrected by said velocity correcting means;

velocity limiting means for setting a velocity limit value range relative to the first velocity if the second velocity is judged to be unobtainable from said receiving means, in order to control the first velocity not to exceed the velocity limit value range; and velocity history storage means for storing velocities in the past, said velocity limiting means using as a reference velocity a mean velocity of velocities within a predetermined past time running distance calculated from information stored in said velocity history storage means if the second velocity is judged to be unobtainable from said receiving means; obtaining upper and lower velocity limit values through addition and subtraction of a predetermined value to and from the reference velocity, and adopting one of the upper and lower velocity limit values as the velocity limit value.

6. A vehicle navigator for receiving radio waves from artificial satellites and outputting present position information, said vehicle navigator comprising:

velocity detecting means for detecting a first velocity of a vehicle;

receiving means for receiving radio waves from artificial satellites and obtaining a second velocity;

velocity correcting means for correcting the first velocity by using the second velocity;

running distance calculating means for calculating a running distance of the vehicle from the velocity corrected by said velocity correcting means; and velocity limiting means for setting a velocity limit value range relative to the first velocity if the second velocity is judged to be unobtainable from said receiving means, in order to control the first velocity not to exceed the velocity limit value range velocity history storage means for storing velocities in the past; and velocity history storage means for storing velocities in the past, said velocity limiting means using as a reference velocity a mean velocity of velocities within a predetermined past time running distance calculated from information stored in said velocity history storage means if the second velocity is judged to be unobtainable from said receiving means; obtaining upper and lower velocity limit values through addition and subtraction of a predetermined value to and from the reference velocity, and adopting one of the upper and lower velocity limit values as the velocity limit value.

7. A vehicle navigator for receiving radio waves from artificial satellites and outputting present position information, said vehicle navigator comprising:

acceleration detecting means for detecting an acceleration of a vehicle;

velocity calculating means for calculating a first velocity of the vehicle on the basis of an acceleration detected by said acceleration detecting means;

receiving means for receiving radio waves from artificial satellites and obtaining a second velocity;

velocity correcting means for correcting the first velocity by using the second velocity;

running distance calculating means for calculating a running distance of the vehicle from the velocity corrected by said velocity correcting means;

velocity limiting means for setting a velocity limit value range relative to the first velocity if the second velocity is judged to be unobtainable from said receiving means, in order to control the first velocity not to exceed the velocity limit value range; and legal limit velocity history storage means for storing legal velocities of roads, said velocity limiting means using as a reference velocity a legal limit velocity of a present road if the second velocity is judged to be unobtainable from said receiving means, obtaining upper and lower velocity limit values through addition and subtraction of a predetermined value to and from the reference velocity, and adopting one of the upper and lower velocity limit values as the velocity limit value.

8. A vehicle navigator for receiving radio waves from artificial satellites and outputting present position information, said vehicle navigator comprising:

velocity detecting means for detecting a first velocity of a vehicle;

receiving means for receiving radio waves from artificial satellites and obtaining a second velocity;

velocity correcting means for correcting the first velocity by using the second velocity;

running distance calculating means for calculating a running distance of the vehicle from the velocity corrected by said velocity correcting means;

velocity limiting means for setting a velocity limit value range relative to the first velocity if the second velocity is judged to be unobtainable from said receiving means, in order to control the first velocity not to exceed the velocity limit value range; and legal limit velocity history storage means for storing legal velocities of roads, said velocity limiting means using as a reference velocity a legal limit velocity of a present road if the second velocity is judged to be unobtainable from said receiving means, obtaining upper and lower velocity limit values through addition and subtraction of a predetermined value to and from the reference velocity, and adopting one of the upper and lower velocity limit values as the velocity limit value.

9. A vehicle navigator for receiving radio waves from artificial satellites and outputting present position information, said vehicle navigator comprising:

acceleration detecting means for detecting an acceleration of a vehicle;

velocity calculating means for calculating a first velocity of the vehicle on the basis of an acceleration detected by said acceleration detecting means;

receiving means for receiving radio waves from artificial satellites and obtaining a second velocity;

velocity correcting means for correcting the first velocity by using the second velocity;

running distance calculating means for calculating a running distance of the vehicle from the velocity corrected by said velocity correcting means;

velocity limiting means for setting a velocity limit value range relative to the first velocity if the second velocity is judged to be unobtainable from said receiving means, in order to control the first velocity not to exceed the velocity limit value range; and legal limit velocity history storage means for storing legal velocities of roads, said velocity limiting means replacing the first velocity by a legal limit velocity if the first velocity calculated by said velocity calculating means takes a zero value or a minus value.

10. A vehicle navigator for receiving radio waves from artificial satellites and outputting present position information, said vehicle navigator comprising:

velocity detecting means for detecting a first velocity of a vehicle;

receiving means for receiving radio waves from artificial satellites and obtaining a second velocity;

velocity correcting means for correcting the first velocity by using the second velocity;

running distance calculating means for calculating a running distance of the vehicle from the velocity corrected by said velocity correcting means;

velocity limiting means for setting a velocity limit value range relative to the first velocity if the second velocity is judged to be unobtainable from said receiving means, in order to control the first velocity not to exceed the velocity limit value range; and legal limit velocity history storage means for storing legal velocities of roads, said velocity limiting means replacing the first velocity by a legal limit velocity if the first velocity calculated by said velocity calculating means takes a zero value or a minus value.

* * * * *